US012623787B2

(12) United States Patent
Brach

(10) Patent No.: US 12,623,787 B2
(45) Date of Patent: May 12, 2026

(54) ENGINE ARRANGEMENT FOR AN AIRCRAFT, AND AIRCRAFT

(71) Applicant: Reiner Brach, Osterholz-Scharmbeck (DE)

(72) Inventor: Reiner Brach, Osterholz-Scharmbeck (DE)

( * ) Notice: Subject to any disclaimer, the term of this patent is extended or adjusted under 35 U.S.C. 154(b) by 0 days.

(21) Appl. No.: 18/869,851

(22) PCT Filed: May 31, 2023

(86) PCT No.: PCT/DE2023/200110
§ 371 (c)(1),
(2) Date: Feb. 24, 2025

(87) PCT Pub. No.: WO2023/232206
PCT Pub. Date: Dec. 7, 2023

(65) Prior Publication Data
US 2025/0229908 A1 Jul. 17, 2025

(30) Foreign Application Priority Data
Jun. 1, 2022 (DE) ...................... 10 2022 113 843.7

(51) Int. Cl.
*B64D 27/20* (2006.01)
(52) U.S. Cl.
CPC ................................... *B64D 27/20* (2013.01)
(58) Field of Classification Search
CPC . F01D 21/045; B64D 27/20; F05D 2220/323; F05D 2260/311; F02K 3/06
See application file for complete search history.

(56) References Cited

U.S. PATENT DOCUMENTS

| | | | |
|---|---|---|---|
| 2,557,522 A | * | 6/1951 | Vautier ................... B64C 21/01 |
| | | | 244/209 |
| 3,237,891 A | | 3/1966 | Wotton |
| 4,417,848 A | * | 11/1983 | Dembeck .............. F01D 21/045 |
| | | | 415/173.1 |

(Continued)

FOREIGN PATENT DOCUMENTS

| | | | |
|---|---|---|---|
| DE | 76 33 441 01 U1 | 6/1977 | |
| DE | 693 10 344 T2 | 10/1997 | |

(Continued)

*Primary Examiner* — Craig Kim
(74) *Attorney, Agent, or Firm* — Norman B. Thot

(57) ABSTRACT

An engine arrangement includes a first and a second engine arranged in a fuselage of an aircraft, and a ballistic protection element. The first engine has a first main body and a first drive body which rotates. The second engine has a second main body and a second drive body which rotates. The ballistic protection element is arranged on the first main body, on the second main body, and/or therebetween. The first and second engines are arranged in a ballistically effective proximity to one another. If mechanical damage occurs, the first and/or the second drive body output(s) respective drive body parts substantially radially into respective ballistic hazard areas. The first and the second drive body are arranged offset to one another. The ballistic protection element slows down to below a hazard speed and/or retains the drive body parts output by the first drive body and/or by the second drive body.

32 Claims, 2 Drawing Sheets

(56)     References Cited

U.S. PATENT DOCUMENTS

| | | | | |
|---|---|---|---|---|
| 4,711,415 | A * | 12/1987 | Binden ................. | B64C 27/325 |
| | | | | 244/6 |
| 5,855,340 | A * | 1/1999 | Bacon .................... | B64D 27/20 |
| | | | | 244/55 |
| 6,575,694 | B1 * | 6/2003 | Thompson ............ | F01D 21/045 |
| | | | | 415/200 |
| 9,032,706 | B2 * | 5/2015 | Marshall ............... | F01D 21/045 |
| | | | | 415/214.1 |
| 9,810,096 | B2 * | 11/2017 | Evans ....................... | F02K 3/06 |
| 10,487,684 | B2 * | 11/2019 | Fracchia ............... | F04D 29/522 |
| 2002/0164244 | A1 * | 11/2002 | Sathianathan ........ | F01D 21/045 |
| | | | | 415/9 |
| 2005/0178890 | A1 | 8/2005 | Bacon | |
| 2017/0137135 | A1 | 5/2017 | Chanez et al. | |
| 2017/0361939 | A1 | 12/2017 | Negulescu et al. | |
| 2018/0134406 | A1 | 5/2018 | Reckzeh et al. | |
| 2018/0202460 | A1 * | 7/2018 | Kray .................... | F04D 29/526 |
| 2018/0283205 | A1 * | 10/2018 | Fracchia ................ | F04D 29/38 |
| 2018/0370644 | A1 | 12/2018 | Coat et al. | |
| 2019/0031363 | A1 | 1/2019 | Hoisington | |
| 2019/0091749 | A1 | 3/2019 | Rajagopal et al. | |
| 2020/0165936 | A1 * | 5/2020 | Kasal .................... | B22F 10/00 |
| 2023/0235682 | A1 * | 7/2023 | Beckham ............... | F01D 25/24 |
| | | | | 415/200 |

FOREIGN PATENT DOCUMENTS

| | | | | |
|---|---|---|---|---|
| DE | 10 2014 208 921 A1 | 11/2015 | | |
| GB | 2361032 A * | 10/2001 | ........... | F01D 21/045 |
| JP | 2025060053 A * | 4/2025 | | |
| WO | WO 2017/085405 A1 | 5/2017 | | |
| WO | WO-2023232206 A1 * | 12/2023 | ............. | B64D 27/20 |

* cited by examiner

ENGINE ARRANGEMENT FOR AN AIRCRAFT, AND AIRCRAFT

CROSS REFERENCE TO PRIOR APPLICATIONS

This application is a U.S. National Phase application under 35 U.S.C. § 371 of International Application No. PCT/DE2023/200110, filed on May 31, 2023 and which claims benefit to German Patent Application No. 10 2022 113 843.7, filed on Jun. 1, 2022. The International Application was published in German on Dec. 7, 2023 as WO 2023/232206 A1 under PCT Article 21(2).

FIELD

The present invention relates to an engine arrangement for an aircraft, comprising a first engine, at least a second engine, and a reference axis, wherein the first engine comprises a first main body having a first longitudinal axis and comprises a first drive body rotating about the first longitudinal axis, the second engine comprises a second longitudinal axis and a second drive body rotating about the second longitudinal axis, the first engine and the second engine are arranged in a ballistically effective proximity to one another with the respective longitudinal axis substantially parallel to the reference axis, and, in the event of mechanical damage, the first drive body and/or the second drive body output or outputs respective drive body parts hazardously acting ballistically in relation to the respective other engine and/or in relation to the respective other drive body substantially radially relative to the respective longitudinal axis into a respective ballistic hazard area, wherein the first engine and the at least second engine are arranged in a fuselage of the aircraft. The present invention also relates to an aircraft comprising such an engine arrangement.

BACKGROUND

Previous engine arrangements for aircraft, in particular when two engines are arranged in the immediate proximity of one another, are often constructed symmetrically and therefore require powerful ballistic protection apparatuses in order to protect one engine against splintered parts output from another engine, for example, when this second-mentioned engine is damaged. Unnecessary weight is therefore added to the aircraft. Additional protection is required when corresponding engines are intended to be arranged in the proximity of the fuselage or in the fuselage.

Engine arrangements are also known on airplanes in which engines are, for example, far enough away from one another that the risk of them damaging one another is ruled out.

U.S. Pat. No. 5,855,340 describes a corporate jet comprising engines of different powers, but without any apparent ballistic protection.

US 2019/0091749 A1 describes a commercial jet in which the engines are arranged on the respective wings. A plurality of engines are in this case arranged to be offset from one another on one wing based on a sweep angle of the wings in the longitudinal direction.

DE 10 2014 208 921 A1 describes an outer engine structure which also acts as a ballistic protection structure for the engine.

US 2018/0134406 A1 describes an aircraft which comprises an additional engine in the tail region.

US 2017/0137135 describes an airplane comprising engine intakes which are arranged to be offset from one another.

U.S. Pat. No. 3,237,891 describes an arrangement of three engines in the tail region of an airplane.

DE 693 10 344 T2 describes two engines which are axially offset from one another on a wing on an airplane, wherein one engine is arranged above the wing and one engine is arranged below the wing.

US 2005/0178890 describes a corporate jet comprising engines of different sizes in the fuselage, but without any specific ballistic protection.

US 2019/0031363 A1 describes a system and a method for operating a shrouded propeller for boundary layer ingestion. Some component parts of the drive system are in this case arranged to be axially offset from one another.

WO 2017/085405 A1 describes a commercial jet comprising an engine arrangement on the wings and in the tail region.

SUMMARY

An aspect of the present invention is to improve upon the prior art.

In an embodiment, the present invention provides an engine arrangement for an aircraft. The engine arrangement includes a first engine arranged in a fuselage of the aircraft, at least one second engine arranged in the fuselage of the aircraft, a ballistic protection element, and a reference axis. The first engine comprise a first main body which comprises a first longitudinal axis, and a first drive body which is configured to rotate about the first longitudinal axis. The at least one second engine comprises a second main body which comprises a second longitudinal axis, and a second drive body which is configured to rotate about the second longitudinal axis. The ballistic protection element is arranged as least one of on the first main body, on the second main body, and between the first main body and the second main body. The first engine and the at least one second engine are arranged in a ballistically effective proximity to one another with the first longitudinal axis and the second longitudinal axis being substantially parallel to the reference axis. In an event of a mechanical damage, at least one of the first drive body outputs drive body parts hazardously acting ballistically in relation to at least one of the at least one second engine and to the second drive body substantially radially relative to the first longitudinal axis into a first ballistic hazard area, and the second drive body outputs drive body parts hazardously acting ballistically in relation to at least one of the first engine and to the first drive body substantially radially relative to the second longitudinal axis into a second ballistic hazard area. The first drive body and the second drive body are arranged to be offset with respect to one another along the reference axis so that the first ballistic hazard area is arranged at a distance from the second drive body which is put at risk by the drive body parts of the first drive body hazardously acting ballistically with respective to the second drive body along the reference axis, and the second ballistic hazard area is arranged at a distance from the first drive body which is put at risk by the drive body parts of the second drive body hazardously acting ballistically with respective to the first drive body along the reference axis. The ballistic protection element is configured to at least one of slow down to below a hazard speed and to retain the drive body parts output by the first drive body hazardously acting ballistically with respect to the at least one of the at least one second engine and the second drive body, and the drive body parts output by the second drive body hazardously acting ballistically with respect to at least one of the first engine and the first drive body.

BRIEF DESCRIPTION OF THE DRAWINGS

The present invention is described in greater detail below on the basis of embodiments and of the drawings in which.

DETAILED DESCRIPTION

Figure 1:
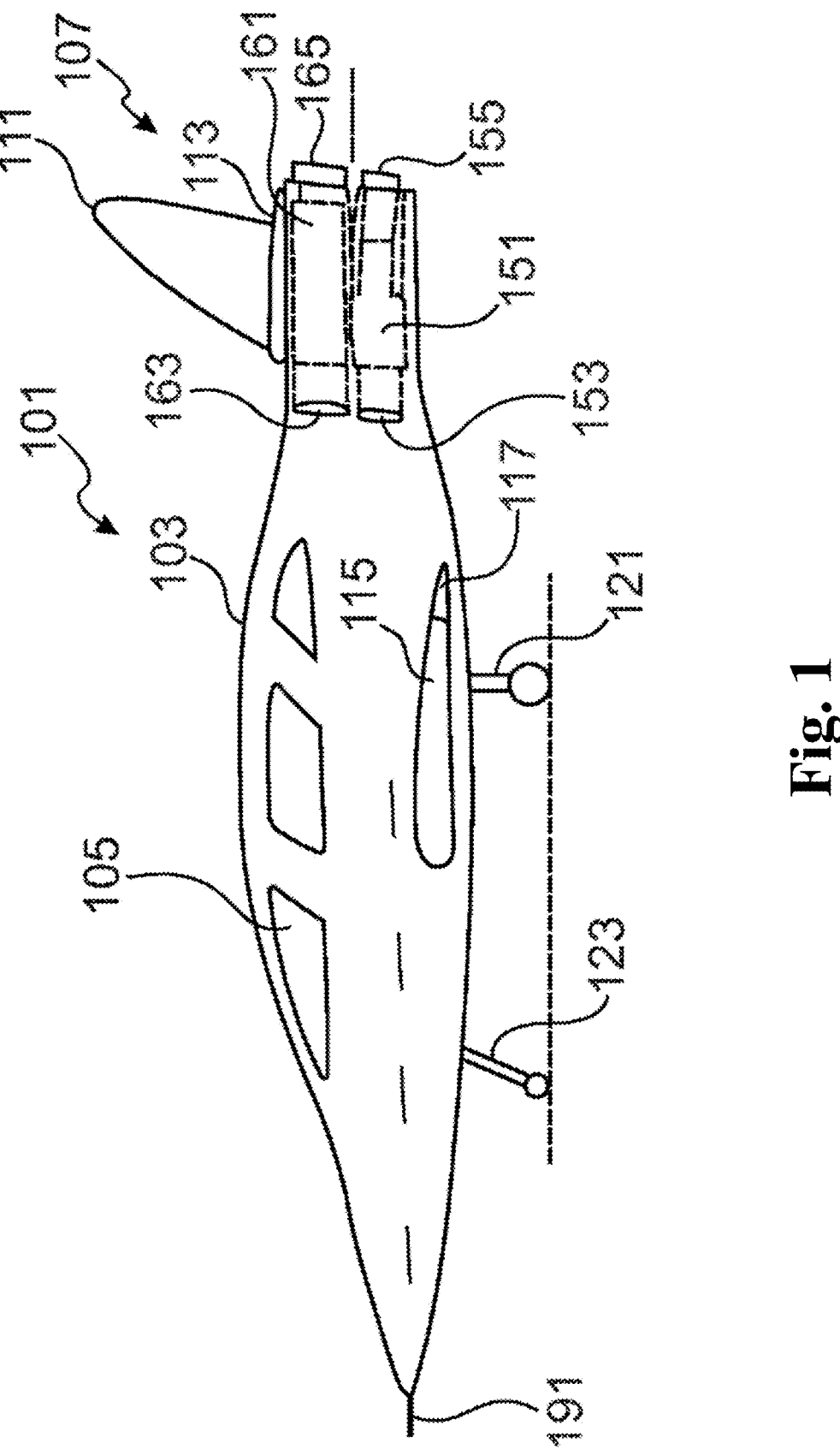
FIG. 1 is a schematic side view of a corporate jet.

The present invention provides an engine arrangement for an aircraft, the engine arrangement comprising a first engine, at least a second engine and a reference axis, wherein the first engine comprises a first main body having a first longitudinal axis and comprises a first drive body rotating about the first longitudinal axis, the second engine comprises a second longitudinal axis and a second drive body rotating about the second longitudinal axis, the first engine and the second engine are arranged in a ballistically effective proximity to one another with the respective longitudinal axis substantially parallel to the reference axis, and, in the event of mechanical damage, the first drive body and/or the second drive body output or outputs respective drive body parts hazardously acting ballistically in relation to the respective other engine and/or in relation to the respective other drive body substantially radially relative to the respective longitudinal axis into a respective ballistic hazard area, wherein the first engine and the at least second engine are arranged in a fuselage of the aircraft, wherein the first drive body and the second drive body are arranged to be offset from one another along the reference axis so that the respective ballistic hazard area is arranged at a distance from the respective drive body put at risk by the hazardously acting drive body parts of the respective other drive body along the reference axis, wherein a ballistic protection element is arranged on the first main body, on the second main body and/or between the first main body and the second main body, wherein the ballistic protection element is configured to slow down the respective drive body parts hazardously acting ballistically in relation to the respective other engine and/or in relation to the respective other drive body to below a hazard speed and/or to retain them.

The core concept of the present invention is that a first drive body and a second drive body are arranged to be offset from one another along the reference axis so that the respective ballistic hazard area is arranged at a distance from the respective drive body put at risk by the hazardously acting drive body parts of the respective other drive body along the reference axis, and therefore critical components of the respective other engine or the fuselage structure being put at risk, for example, by engine blades breaking off in a jet engine, is ruled out mechanically, solely owing to the geometric arrangement of the respective engines relative to one another along the reference axis in the fuselage of the aircraft. The ballistic protection element in this case serves to catch and/or slow down components exiting at an accelerated speed owing to a failure, and can be constructed to be as light as possible in cooperation with the drive bodies arranged to be offset.

The following terms are explained in greater detail in this context:

An "engine arrangement" in this context is the structurally selected positioning of different engines for an aircraft so that, for example, a position of a first engine relative to a second engine is intentionally selected so that the desired geometric configuration between the engines is achieved. An "aircraft" in this context can, for example, be a helicopter, an airplane or a drive system for a motorized paraglider. The aircraft here comprises a respective "engine", i.e., a drive unit, in particular an engine generating thrust by a combustion force.

A "reference axis" is in this case, for example, an axis which extends substantially in parallel with a longitudinal axis of the respective engine or so as to be geometrically averaged between a plurality of engines so that a geometric relationship is produced for radially exiting drive body parts of the respective engines. Depending on the type of engine, the reference axis can in this case also be parallel to an axis along which thrust of the respective engines is acting. This longitudinal axis is here in particular the axis about which component parts of the engine, i.e., for example, the respective drive body, rotate and towards which drive body parts can potentially exit in an orthogonal direction. One example is that, in the case of a jet engine, the reference axis would be arranged substantially in parallel with the axis of rotation of turbine parts, and in the case of a piston engine, it would be arranged substantially in parallel with a crankshaft.

A "main body" in this case describes the enveloping body of the respective engine, wherein the main body can, for example, comprise additional units, such as transmissions, generators and the like. The engine furthermore comprises a respective "longitudinal axis", wherein the longitudinal axis is also the axis of rotation for rotating drive components. A respective "drive body", which describes the rotating parts in a jet engine and denotes the piston and the connecting rod comprising the crankshaft in a piston engine, for example, rotates about the longitudinal axis.

In conjunction with the present invention, it is noted that the corresponding engines are in this case arranged "in ballistically effective proximity" to one another, i.e., at a corresponding distance at which components breaking off or coming out of the respective drive body can damage the respective other drive body and/or the respective other engine. Accordingly, "drive body parts", i.e., components coming out of or originating from the drive body, are ballistically effective in relation to the respective other engine by causing damage upon impact due, for example, to kinetic energy. Owing to the principles involved, in an engine comprising a rotating drive body, a hazard is produced substantially radially relative to the respective longitudinal axis, i.e., radially starting from the longitudinal axis. The "ballistic hazard area" here describes the region in which drive body parts can move or impact.

The "fuselage" describes the main structure of the aircraft on which, for example, wings, tail units and additional units, such as the landing gear, are arranged and mechanically fixed. The fuselage is in particular constructed as a fuselage covering having a cylindrical cross section, for example, wherein reductions in cross section exist in corresponding end regions of the fuselage for aerodynamic purposes so that the end regions are, for example, rounded or tapered.

"Arranged to be offset from one another along the reference axis" describes an intentional selection of a corresponding location for the respective engine so that a longitudinal offset along the longitudinal axis exists, and therefore corresponding drive bodies are arranged to be longitudinally offset from one another.

A "ballistic protection element" describes an assembly or a component which is configured and used for the corresponding purpose so that the kinetic energy of exiting drive body parts is reduced, and therefore the drive body parts no longer pose a risk. Such a ballistic protection element can, for example, consist of a steel sheet, a titanium sheet and/or also accordingly alternatively used or combined fabrics, such as those made of aramid fibers and/or glass fibers. Different ballistic protection systems are known, so that the ballistic protection element can comprise both hard materials for breaking up drive body parts and also soft elements, for example, an aramid fabric, in order to further reduce the speed of accordingly fragmented drive body parts.

In an embodiment of the present invention, a respective compressor wheel of a first engine can, for example, be arranged so that it is possible for radially exiting compressor wheel parts not to strike a respective compressor wheel of a second engine in the event of damage. The same applies to corresponding turbine wheels or other component parts of the drive body in an engine. Corresponding components of the engine, in particular the drive body, can in this case, for example, be shifted relative to one another along the reference axis by more than 10%, 15%, 25%, in particular more than 35%, of a total length of the respective engine. The ballistic protection element can therefore be configured to be considerably lighter since a simultaneous failure of the different engines can be expected in different regions along the reference axis.

The ballistic protection element in the respective main body of the respective engine and/or between the respective main bodies of the respective engines serves to still retain exiting component parts in accordance with components arranged beside one another along the reference axis. The respective ballistic protection element is in this case in particular configured to slow down the respective drive body parts hazardously acting ballistically in relation to the respective other engine and/or in relation to the respective other drive body to below a hazard speed and/or to retain them. It is noted in this context that a corresponding shift of the respective engines along the reference axis relative to one another is achieved in that, for example, only components having lower energy, such as a turbine stage having smaller turbine blades and a shorter radius of movement, can exit the main body of the engine, and therefore the ballistic protection element needs to be selected to be considerably less powerful than would be the case for conventional engine arrangements. A hazard speed in this case describes the speed that would be sufficient for corresponding components, for example, shrapnel, to be able to damage components of a respective other engine.

In an embodiment of the present invention, the ballistic protection can, for example, in particular be a synthetic fibrous fabric, in particular an aramid fabric and/or a polyamide fabric, an in particular hardened steel, a titanium and/or a ceramic, or comprises these respective component parts. The respective component parts are in this case in particular configured as a composite protection in which, for example, a hard component, such as ceramic or hardened steel, can break up corresponding shrapnel parts, which are then caught, for example, by an aramid fabric. Reference is also made in this context to a "spall liner".

In an embodiment of the present invention, a first engine and the at least second engine can, for example, be arranged in a tail region of the fuselage of the aircraft.

A "tail region" is in this case in particular a region of the fuselage taking up the rear 25%, 20%, in particular 15%, of the aircraft, in particular of the fuselage of the aircraft. Arranging the engines in the tail region reduces noise emissions to an interior space and thus accordingly makes the aircraft comfortable.

If in this case the first engine and the second engine are arranged above one another and in particular in a plane of symmetry of the aircraft in the flight direction, engines of different powers can also, for example, be used which can then be constructed with considerably fewer ballistic protection elements despite the close spatial proximity, for example, in the tail region of a fuselage of an aircraft, and a high level of safety of the aircraft can still be obtained.

A primarily damage-relevant component, such as a first compressor wheel, which is highly likely to form shrapnel in the event of a bird strike, for example, can in this case even be arranged outside the respective other engine along the reference axis so that, for example, the hazard region, which is at comparatively high risk from shrapnel parts, is outside the contour of the respective other engine. This can, for example, be selected for the more powerful of the two engines so that the component having the highest risk of failure, namely, the compressor wheel of the most powerful engine, is arranged so that, in the event of a failure, fatal consequences for the respective less powerful engine are avoided.

An engine can in this case be a turbine jet engine, in particular a turbojet engine, a bypass turbine engine or a turboprop engine. The respective turbine unit is arranged according to the present invention in particular in turboprop engines so that a mutual risk in the event of a failure is lessened and is minimized by the arrangement according to the present invention with a relatively light ballistic protection element.

The present invention also provides an aircraft which benefits from the engine arrangement according to any of the preceding embodiments.

The present invention will be explained in greater detail below based on exemplary embodiments.

A corporate jet 101 comprises a fuselage structure 103. The fuselage structure 103 acts as part of the structural frame of the corporate jet 101 and comprises windowpanes 105, which act as a cockpit windowpane. The corporate jet 101 is depicted as a low-wing plane comprising a conventional tail unit in a standard configuration with a rudder unit 111, a horizontal tail unit 113, and a wing 115. The rudder unit 111 and the horizontal tail unit 113 are arranged on the tail 107.

The wing 115 comprises lift aids 117, i.e., landing flaps, for example, for increasing the lift in certain flight situations such as take-off and landing. The corporate jet 101 also comprises a main landing gear 121 and a nose landing gear 123, each of which are retractable.

Two engines, namely, an engine 151 comprising an air intake 153 and a nozzle 155 and an engine 161 comprising an air intake 163 and a nozzle 165, are arranged in the tail 107. The engines 151 and 161 are bypass turbine engines which operate in accordance with the principle of a gas turbine having an additional bypass fan (which is not shown in detail). For this purpose, the engines draw in air through the corresponding air intakes 153 and 163, increase the energy contained in the air by combustion in a respective combustion chamber (which is not shown), and eject corresponding hot and accelerated exhaust gases together with the accelerated air masses from the respective bypass fan through the respective nozzles 155 and 165, so that thrust is produced for the corporate jet 101 and can accelerate it. In a fully loaded take-off configuration, the corporate jet 101 weighs approximately 5,000 kg, which corresponds to a weight force of approximately 49,000 N. Engine 151 has a maximum thrust of approximately 1,5000 N, while engine 161 has a maximum thrust of 2,5000 N.

Engine 151 is therefore configured, with its maximum thrust, to be able to safely and efficiently operate the corporate jet 101, in particular during cruising flight, whereas engine 161, with its considerably greater thrust, can be used to provide sufficient capacity of the corporate jet 101 under hot-and-high conditions and/or, for example, when particular short take-off and landing distances are sought. The maximum thrust of the engine 151 is in this case selected so that the power required for the total weight of the aircraft for an aborted take-off, which is no longer possible, is authorized to be available in line with a so-called decision-making ability in order to provide a safe ascent of the corporate jet 101. The capacity of the engine 151 can also exclusively be used, for example, when enough runway is available for a long take-off run. Engine 161 is then in idle mode and can remain in idle mode without affecting maintenance-related operating hours. Corresponding amounts of fuel can also be saved.

Figure 2:
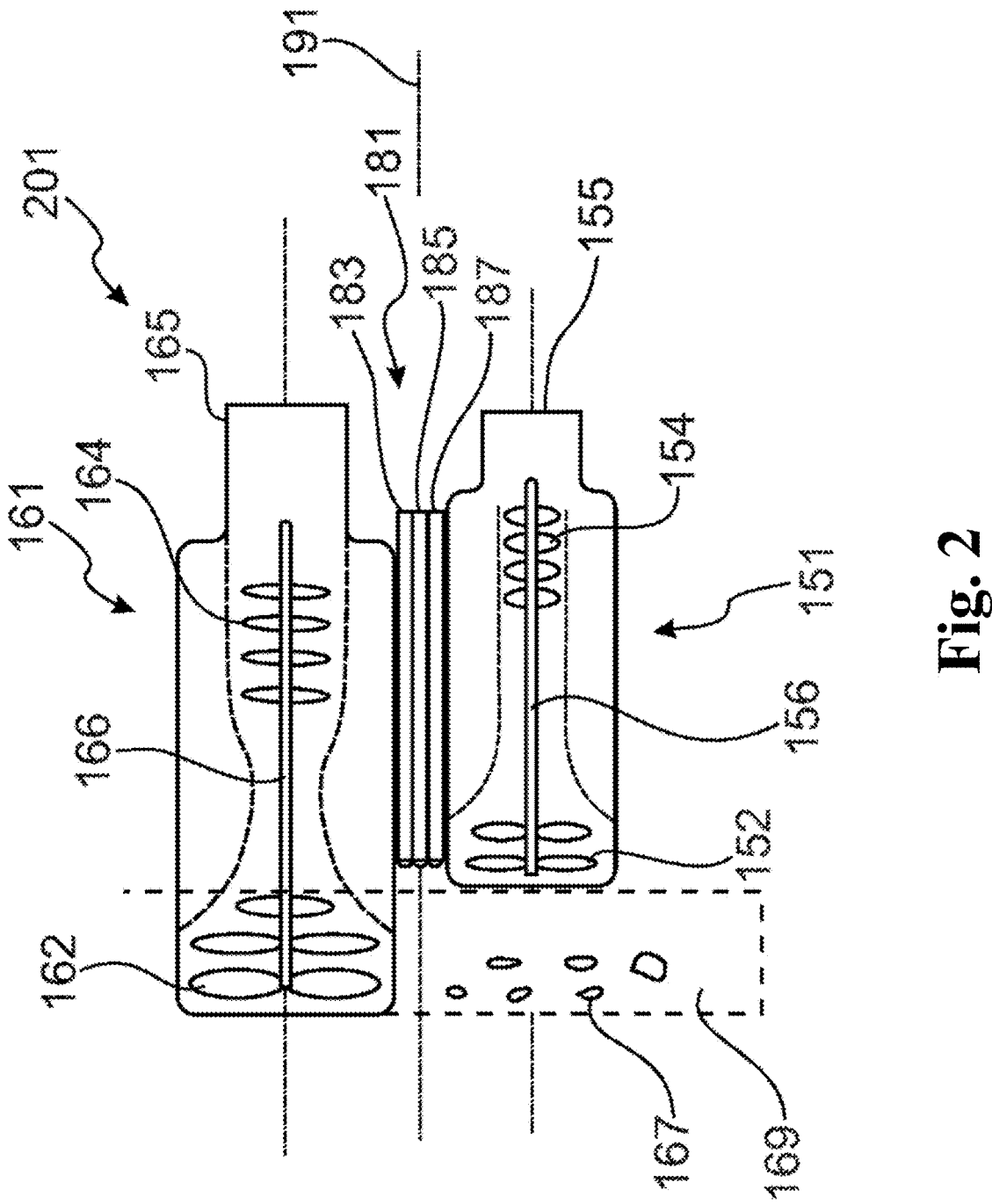
FIG. 2 is a view of a detail of an engine arrangement of the corporate jet in FIG. 1.

An engine arrangement 201 of a shaft 156 of the engine 151 and a shaft 166 of the engine 161 along the longitudinal axis 191 (see also FIG. 2) is selected so that, in the event of a failure of a compressor wheel 162 of the more powerful engine 161, resulting shrapnel parts 167 can exit in a hazard region 169, wherein the hazard region 169 is completely outside the contour of the engine 151. The shrapnel parts 167 therefore cannot strike the engine 151. Ballistic protection 181 is arranged between the engines 151 and 161, which ballistic protection 181 is configured in a plurality of layers, namely a titanium layer 183, an aramid fabric 185, and another titanium layer 187, wherein the respective titanium layers 183 and 187 are each facing the engines 151, 161 and the aramid fabric 185 is arranged between the titanium layers 183 and 187. In the event of a failure of a comparatively smaller compressor wheel 152 of the engine 151 or the failure of respective turbine stages 154 and 164, which each output shrapnel parts having lower energy, the ballistic protection 181 can be configured to be considerably smaller than if, for example, in a parallel arrangement of both engines, an exit path and thus the hazard region 169 were to overlap with the engine 151.

The arrangement of the ballistic protection 181 in this case is such that the respective titanium layer 183 or 187 breaks up the shrapnel parts output by the respective engine 151 or 161, which are then caught in the aramid fabric 185, which produces composite armoring in the ballistic protection 181.

The present invention is not limited to embodiments described herein; reference should be had to the appended claims.

LIST OF REFERENCE NUMERALS

101 Corporate jet
103 Fuselage structure
105 Windowpane
107 Tail
111 Rudder unit
113 Horizontal tail unit
115 Wing
117 Lift aids
121 Main landing gear
123 Nose landing gear
151 Engine
152 Compressor wheel
153 Air intake
154 Turbine stage
155 Nozzle 156 Shaft
161 Engine
162 Compressor wheel
163 Air intake
164 Turbine stage
165 Nozzle
166 Shaft
167 Shrapnel parts
169 Hazard region
181 Ballistic protection
183 Titanium layer
185 Aramid fabric
187 Titanium layer
191 Reference axis
201 Engine arrangement

What is claimed is:

1. An engine arrangement for an aircraft, the engine arrangement comprising:

a first engine arranged in a fuselage of the aircraft, the first engine comprising a first engine length, a first longitudinal axis, and a first drive body which is configured to rotate about the first longitudinal axis;

at least one second engine arranged in the fuselage of the aircraft, the at least one second engine comprising a second engine length, a second longitudinal axis, and a second drive body which is configured to rotate about the second longitudinal axis;

a ballistic protection element arranged between the first engine and the at least one second engine so as to overlap with a majority of the first engine length and the second engine length; and a reference axis, wherein, the first engine and the at least one second engine are arranged in a ballistically effective proximity to one another with the first longitudinal axis and the second longitudinal axis being substantially parallel to the reference axis, in an event of a mechanical damage, at least one of, the first drive body outputs drive body parts hazardously acting ballistically in relation to at least one of the at least one second engine and to the second drive body substantially radially relative to the first longitudinal axis into a first ballistic hazard area, and the second drive body outputs drive body parts hazardously acting ballistically in relation to at least one of the first engine and to the first drive body substantially radially relative to the second longitudinal axis into a second ballistic hazard area, the first drive body and the second drive body are arranged to be offset with respect to one another along the reference axis so that, the first ballistic hazard area is arranged at a distance from the second drive body which is put at risk by the drive body parts of the first drive body hazardously acting ballistically with respective to the second drive body along the reference axis, and the second ballistic hazard area is arranged at a distance from the first drive body which is put at risk by the drive body parts of the second drive body hazardously acting ballistically with respective to the first drive body along the reference axis, and the ballistic protection element is configured to at least one of slow down to below a hazard speed and to retain, the drive body parts output by the first drive body hazardously acting ballistically with respect to the at least one of the at least one second engine and the second drive body, and the drive body parts output by the second drive body hazardously acting ballistically with respect to at least one of the first engine and the first drive body.

2. The engine arrangement as recited in claim 1, wherein, at least one of, the first drive body comprises a first compressor wheel and a first turbine wheel, and the second drive body comprises a second compressor wheel and a second turbine wheel, and at least one of, the first compressor wheel and the second compressor wheel, and the first turbine wheel and the second turbine wheel, are arranged to be offset with respect to one another along the reference axis so that, the first ballistic hazard area is arranged at a distance from at least one of the second compressor wheel and the second turbine wheel which is put at risk by the hazardously acting ballistically drive body parts of at least one of the first compressor wheel and the first turbine wheel along the reference axis, and the second ballistic hazard area is arranged at a distance from at least one of the first compressor wheel and the first turbine wheel which is put at risk by the hazardously acting ballistically drive body parts of at least one of the second compressor wheel and the second turbine wheel along the reference axis.

3. The engine arrangement as recited in claim 2, wherein at least one of, the first drive body and the second drive body, the first compressor wheel and the second compressor wheel, and the first turbine wheel and the second turbine wheel, are arranged to be offset from one another along the reference axis so that, the first ballistic hazard area is arranged at a distance from at least one of the second drive body, the second compressor wheel, and the second turbine wheel which is/are put at risk by at least one of the drive body parts of the first drive body, the first compressor wheel, and the first turbine wheel, which is/are hazardously acting ballistically along the reference axis by more than 10% of at least one of a first total length of the first engine and a second total length of the second engine, and the second ballistic hazard area is arranged at a distance from at least one of the first drive body, the first compressor wheel, and the first turbine wheel which is/are put at risk by at least one of the drive body parts of the second drive body, the second compressor wheel, and the second turbine wheel, which is/are hazardously acting ballistically along the reference axis by more than 10% of at least one of the first total length of the first engine and the second total length of the second engine.

4. The engine arrangement as recited in claim 1, wherein, the ballistic protection element comprises at least one of a synthetic fibrous fabric, a hardened steel, a titanium, and a ceramic, and the at least one of the synthetic fibrous fabric, the hardened steel, the titanium, and the ceramic is configured as a ballistically effective composite protection.

5. The engine arrangement as recited in claim 4, wherein the synthetic fibrous fabric is at least one of an aramid fabric and a polyamide fabric.

6. The engine arrangement as recited in claim 1, wherein, the fuselage of the aircraft comprises a tail region, and the first engine and the at least one second engine are each arranged in the tail region.

7. The engine arrangement as recited in claim 1, wherein, the first engine and the at least one second engine are arranged above one another in the fuselage of the aircraft, and the first engine and the at least one second engine are arranged substantially in an aerodynamic plane of symmetry in a flight direction of the aircraft.

8. The engine arrangement as recited in claim 1, wherein the first engine and the at least one second engine have a maximum power output that are different from one another.

9. The engine arrangement as recited in claim 1, wherein, the first engine has a first maximum thrust, the at least one second engine has a second maximum thrust, and the first maximum thrust of the first engine is at most 45% to 90% of the second maximum thrust of the second engine.

10. The engine arrangement as recited in claim 1, wherein at least one of the first engine and the at least one second engine is a turbine jet engine or a turboprop engine.

11. The engine arrangement as recited in claim 10, wherein the turbine jet engine is a turbojet engine or a bypass turbine engine.

12. An aircraft comprising the engine arrangement as recited in claim 1.

13. An engine arrangement for an aircraft, the engine arrangement comprising:

a first engine arranged in a fuselage of the aircraft, the first engine comprising a first main body which comprises a first longitudinal axis, and a first drive body which is configured to rotate about the first longitudinal axis;

at least one second engine arranged in the fuselage of the aircraft, the at least one second engine comprising a second main body which comprises a second longitudinal axis, and a second drive body which is configured to rotate about the second longitudinal axis;

a ballistic protection element arranged as least one of on the first main body, on the second main body, and between the first main body and the second main body; and a reference axis, wherein, the first engine and the at least one second engine are arranged in a ballistically effective proximity to one another with the first longitudinal axis and the second longitudinal axis being substantially parallel to the reference axis, in an event of a mechanical damage, at least one of, the first drive body outputs drive body parts hazardously acting ballistically in relation to at least one of the at least one second engine and to the second drive body substantially radially relative to the first longitudinal axis into a first ballistic hazard area, and the second drive body outputs drive body parts hazardously acting ballistically in relation to at least one of the first engine and to the first drive body substantially radially relative to the second longitudinal axis into a second ballistic hazard area, the first drive body and the second drive body are arranged to be offset with respect to one another along the reference axis so that, the first ballistic hazard area is arranged at a distance from the second drive body which is put at risk by the drive body parts of the first drive body hazardously acting ballistically with respective to the second drive body along the reference axis, and the second ballistic hazard area is arranged at a distance from the first drive body which is put at risk by the drive body parts of the second drive body hazardously acting ballistically with respective to the first drive body along the reference axis, the ballistic protection element is configured to at least one of slow down to below a hazard speed and to retain, the drive body parts output by the first drive body hazardously acting ballistically with respect to the at least one of the at least one second engine and the second drive body, and the drive body parts output by the second drive body hazardously acting ballistically with respect to at least one of the first engine and the first drive body, at least one of, the first drive body comprises a first compressor wheel and a first turbine wheel, and the second drive body comprises a second compressor wheel and a second turbine wheel, and at least one of, the first compressor wheel and the second compressor wheel, and the first turbine wheel and the second turbine wheel, are arranged to be offset with respect to one another along the reference axis so that, the first ballistic hazard area is arranged at a distance from at least one of the second compressor wheel and the second turbine wheel which is put at risk by the hazardously acting ballistically drive body parts of at least one of the first compressor wheel and the first turbine wheel along the reference axis, and the second ballistic hazard area is arranged at a distance from at least one of the first compressor wheel and the first turbine wheel which is put at risk by the hazardously acting ballistically drive body parts of at least one of the second compressor wheel and the second turbine wheel along the reference axis, and at least one of, the first drive body and the second drive body, the first compressor wheel and the second compressor wheel, and the first turbine wheel and the second turbine wheel, are arranged to be offset from one another along the reference axis so that, the first ballistic hazard area is arranged at a distance from at least one of the second drive body, the second compressor wheel, and the second turbine wheel which is/are put at risk by at least one of the drive body parts of the first drive body, the first compressor wheel, and the first turbine wheel, which is/are hazardously acting ballistically along the reference axis by more than 10% of at least one of a first total length of the first engine and a second total length of the second engine, and the second ballistic hazard area is arranged at a distance from at least one of the first drive body, the first compressor wheel, and the first turbine wheel which is/are put at risk by at least one of the drive body parts of the second drive body, the second compressor wheel, and the second turbine wheel, which is/are hazardously acting ballistically along the reference axis by more than 10% of at least one of the first total length of the first engine and the second total length of the second engine.

14. The engine arrangement as recited in claim 13, wherein, the ballistic protection element comprises at least one of a synthetic fibrous fabric, a hardened steel, a titanium, and a ceramic, and the at least one of the synthetic fibrous fabric, the hardened steel, the titanium, and the ceramic is configured as a ballistically effective composite protection.

15. The engine arrangement as recited in claim 14, wherein the synthetic fibrous fabric is at least one of an aramid fabric and a polyamide fabric.

16. The engine arrangement as recited in claim 13, wherein, the fuselage of the aircraft comprises a tail region, and the first engine and the at least one second engine are each arranged in the tail region.

17. The engine arrangement as recited in claim 13, wherein, the first engine and the at least one second engine are arranged above one another in the fuselage of the aircraft, and the first engine and the at least one second engine are arranged substantially in an aerodynamic plane of symmetry in a flight direction of the aircraft.

18. The engine arrangement as recited in claim 13, wherein the first engine and the at least one second engine have a maximum power output that are different from one another.

19. The engine arrangement as recited in claim 13, wherein, the first engine has a first maximum thrust, the at least one second engine has a second maximum thrust, and the first maximum thrust of the first engine is at most 45% to 90% of the second maximum thrust of the second engine.

20. The engine arrangement as recited in claim 13, wherein at least one of the first engine and the at least one second engine is a turbine jet engine or a turboprop engine.

21. The engine arrangement as recited in claim 20, wherein the turbine jet engine is a turbojet engine or a bypass turbine engine.

22. An aircraft comprising the engine arrangement as recited in claim 13.

23. An engine arrangement for an aircraft, the engine arrangement comprising:

a first engine arranged in a fuselage of the aircraft, the first engine comprising a first main body which comprises a first longitudinal axis, and a first drive body which is configured to rotate about the first longitudinal axis;

at least one second engine arranged in the fuselage of the aircraft, the at least one second engine comprising a second main body which comprises a second longitudinal axis, and a second drive body which is configured to rotate about the second longitudinal axis;

a ballistic protection element arranged as least one of on the first main body, on the second main body, and between the first main body and the second main body, wherein, the ballistic protection element comprises at least one of a hardened steel, a titanium, and a ceramic, and the at least one of the hardened steel, the titanium, and the ceramic is configured as a ballistically effective composite protection; and a reference axis, wherein, the first engine and the at least one second engine are arranged in a ballistically effective proximity to one another with the first longitudinal axis and the second longitudinal axis being substantially parallel to the reference axis, in an event of a mechanical damage, at least one of, the first drive body outputs drive body parts hazardously acting ballistically in relation to at least one of the at least one second engine and to the second drive body substantially radially relative to the first longitudinal axis into a first ballistic hazard area, and the second drive body outputs drive body parts hazardously acting ballistically in relation to at least one of the first engine and to the first drive body substantially radially relative to the second longitudinal axis into a second ballistic hazard area, the first drive body and the second drive body are arranged to be offset with respect to one another along the reference axis so that, the first ballistic hazard area is arranged at a distance from the second drive body which is put at risk by the drive body parts of the first drive body hazardously acting ballistically with respective to the second drive body along the reference axis, and the second ballistic hazard area is arranged at a distance from the first drive body which is put at risk by the drive body parts of the second drive body hazardously acting ballistically with respective to the first drive body along the reference axis, and the ballistic protection element is configured to at least one of slow down to below a hazard speed and to retain, the drive body parts output by the first drive body hazardously acting ballistically with respect to the at least one of the at least one second engine and the second drive body, and the drive body parts output by the second drive body hazardously acting ballistically with respect to at least one of the first engine and the first drive body.

24. The engine arrangement as recited in claim 23, wherein, at least one of, the first drive body comprises a first compressor wheel and a first turbine wheel, and the second drive body comprises a second compressor wheel and a second turbine wheel, and at least one of, the first compressor wheel and the second compressor wheel, and the first turbine wheel and the second turbine wheel, are arranged to be offset with respect to one another along the reference axis so that, the first ballistic hazard area is arranged at a distance from at least one of the second compressor wheel and the second turbine wheel which is put at risk by the hazardously acting ballistically drive body parts of at least one of the first compressor wheel and the first turbine wheel along the reference axis, and the second ballistic hazard area is arranged at a distance from at least one of the first compressor wheel and the first turbine wheel which is put at risk by the hazardously acting ballistically drive body parts of at least one of the second compressor wheel and the second turbine wheel along the reference axis.

25. The engine arrangement as recited in claim 24, wherein at least one of, the first drive body and the second drive body, the first compressor wheel and the second compressor wheel, and the first turbine wheel and the second turbine wheel, are arranged to be offset from one another along the reference axis so that, the first ballistic hazard area is arranged at a distance from at least one of the second drive body, the second compressor wheel, and the second turbine wheel which is/are put at risk by at least one of the drive body parts of the first drive body, the first compressor wheel, and the first turbine wheel, which is/are hazardously acting ballistically along the reference axis by more than 10% of at least one of a first total length of the first engine and a second total length of the second engine, and the second ballistic hazard area is arranged at a distance from at least one of the first drive body, the first compressor wheel, and the first turbine wheel which is/are put at risk by at least one of the drive body parts of the second drive body, the second compressor wheel, and the second turbine wheel, which is/are hazardously acting ballistically along the reference axis by more than 10% of at least one of the first total length of the first engine and the second total length of the second engine.

26. The engine arrangement as recited in claim 23, wherein, the fuselage of the aircraft comprises a tail region, and the first engine and the at least one second engine are each arranged in the tail region.

27. The engine arrangement as recited in claim 23, wherein, the first engine and the at least one second engine are arranged above one another in the fuselage of the aircraft, and the first engine and the at least one second engine are arranged substantially in an aerodynamic plane of symmetry in a flight direction of the aircraft.

28. The engine arrangement as recited in claim 23, wherein the first engine and the at least one second engine have a maximum power output that are different from one another.

29. The engine arrangement as recited in claim 23, wherein, the first engine has a first maximum thrust, the at least one second engine has a second maximum thrust, and the first maximum thrust of the first engine is at most 45% to 90% of the second maximum thrust of the second engine.

30. The engine arrangement as recited in claim 23, wherein at least one of the first engine and the at least one second engine is a turbine jet engine or a turboprop engine.

31. The engine arrangement as recited in claim 30, wherein the turbine jet engine is a turbojet engine or a bypass turbine engine.

32. An aircraft comprising the engine arrangement as recited in claim 23.

* * * * *